United States Patent
Kim et al.

(10) Patent No.: US 7,339,921 B2
(45) Date of Patent: Mar. 4, 2008

(54) CONNECTION IDENTIFICATION ALLOCATING SYSTEM AND METHOD IN A BROADBAND WIRELESS ACCESS COMMUNICATION SYSTEM

(75) Inventors: Il-Whan Kim, Incheon (KR); Sung-Hyun Cho, Seoul (KR); Sang-Boh Yun, Seongnam-si (KR); Won-Hyoung Park, Seoul (KR); Chung-Gu Kang, Seoul (KR); Jeong-Hwan Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 456 days.

(21) Appl. No.: 11/125,585

(22) Filed: May 10, 2005

(65) Prior Publication Data

US 2005/0286451 A1 Dec. 29, 2005

(30) Foreign Application Priority Data

Jun. 24, 2004 (KR) .................... 10-2004-0047750

(51) Int. Cl.
*H04J 3/24* (2006.01)
(52) U.S. Cl. .................. 370/349; 370/395.31; 370/328
(58) Field of Classification Search ............... 370/329, 370/338, 341, 349, 393, 395.3–395.32, 442, 370/470, 471
See application file for complete search history.

(56) References Cited

U.S. PATENT DOCUMENTS

2002/0038385 A1* 3/2002 Kalliokulju ................. 709/247
2002/0122411 A1* 9/2002 Zimmerman et al. ....... 370/349

FOREIGN PATENT DOCUMENTS

WO    WO 02/51098    6/2002

OTHER PUBLICATIONS

Degermark et al., "IP Header Compression", Feb. 1999.
Segal et al., "H-ARQ Support Corrections, for OFDMA PHY Mode From MAC Perspective", Apr. 15, 2004.

* cited by examiner

*Primary Examiner*—Rafael Perez-Gutierrez
*Assistant Examiner*—Abdias Mondesir
(74) *Attorney, Agent, or Firm*—The Farrell Law Firm, PC (57) ABSTRACT

Provided is a connection identification (CID) allocating method in a Broadband Wireless Access (BWA) communication system having a medium access control protocol data unit (MAC PDU) format with a header field including control information and a payload field including user data. The header field has a first CID field of a first length indicating a CID of a mobile subscriber station (MSS), a second CID field of a second length and indicating the CID of the MSS by being concatenated with a CID of the first CID field, and a type field indicating whether the second CID field is used. The method includes determining a CID to be allocated to a particular MSS; and if the length of the determined CID is equal to the first length, including the determined CID in the first CID field, including, in the type field, information indicating that the second CID field is not used, and transmitting the MAC PDU to the MSS.

11 Claims, 8 Drawing Sheets

CONNECTION IDENTIFICATION ALLOCATING SYSTEM AND METHOD IN A BROADBAND WIRELESS ACCESS COMMUNICATION SYSTEM

PRIORITY

This application claims priority under 35 U.S.C. § 119 to an application entitled "Connection Identification Allocating System and Method in Broadband Wireless Access Communication System" filed in the Korean Intellectual Property Office on Jun. 24, 2004 and assigned Serial No. 2004-47750, the contents of which are incorporated herein by reference.

BACKGROUND OF THE INVENTION

1. Field of the Invention

The present invention relates generally to a Broadband Wireless Access (BWA) communication system, and in particular, to a system and method for dynamically allocating a connection identification (CID) having a variable length.

2. Description of the Related Art

Many attempts have been made to provide services having a variety of quality-of-services (QoSs) at a rate of around 100 Mbps in $4^{th}$ generation (4G) communication systems, i.e., next generation communication systems. In particular, the attempts focus on a high-speed data service with guaranteed mobility and QoS in Broadband Wireless Access (BWA) communication systems, such as Local Area Network (LAN) systems and Metropolitan Area Network (MAN) systems, of the 4G communication systems. An Institute of Electrical and Electronics Engineers (IEEE) 802.16 communication system adopts Orthogonal Frequency Division Multiplexing (OFDM) technology and Orthogonal Frequency Division Multiple Access (OFDMA) technology to support broadband transmission network to a physical channel of a wireless MAN system. By applying the OFDM/OFDMA technologies to the wireless MAN system, the IEEE 802.16 communication system enables high-speed data transmission by transmitting a physical channel signal using a plurality of subcarriers. That is, the IEEE 802.16 communication system is an OFDM/OFDMA BWA communication system. The IEEE 802.16d communication system provides wireless broadband Internet services to subscriber stations (SSs). The SSs are mobile and are referred to as "mobile subscriber stations (MSSs)."

A configuration of the IEEE 802.16d communication system will now be described with reference to FIG. 1, which illustrates a schematic configuration of a conventional IEEE 802.16d communication system.

Figure 1:
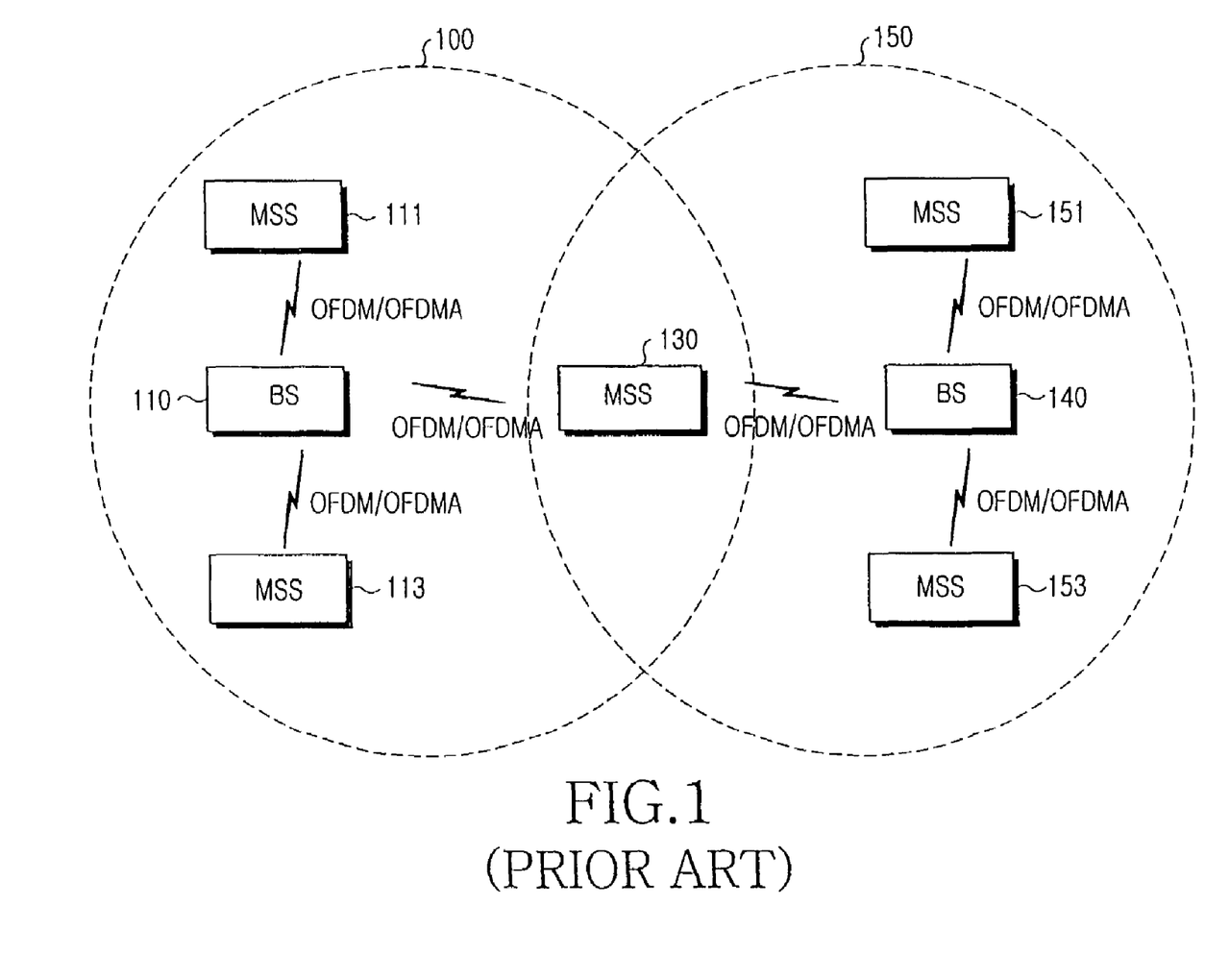
FIG. 1 illustrates a schematic configuration of a conventional IEEE 802.16d communication system.

Referring to FIG. 1, the IEEE 802.16d communication system has a multi-cell configuration, i.e., has a first cell 100 and a second cell 150, and includes a first base station (BS) 110 managing the first cell 100, a second BS 140 managing the second cell 150, and a plurality of MSSs 111, 113, 130, 151 and 153. Signal transmission/reception between the BSs 110 and 140 and the MSSs 111, 113, 130, 151 and 153 are achieved using the OFDM/OFDMA technologies. The MSS 130 exists in a border area between the first cell 100 and the second cell 150, i.e., a handoff area. That is, if the MSS 130 moves to the second BS 140 while transmitting/receiving signals to/from the first BS 110, its serving BS is changed from the first BS 110 to the second BS 140.

With reference to FIG. 1, the configuration of the conventional IEEE 802.16d communication system has been described. A frame format of a medium access control (MAC) layer in an IEEE 802.16d communication system will now be described with reference to FIG. 2 which illustrates a format of a frame of a conventional IEEE 802.16d communication system.

Figure 2:
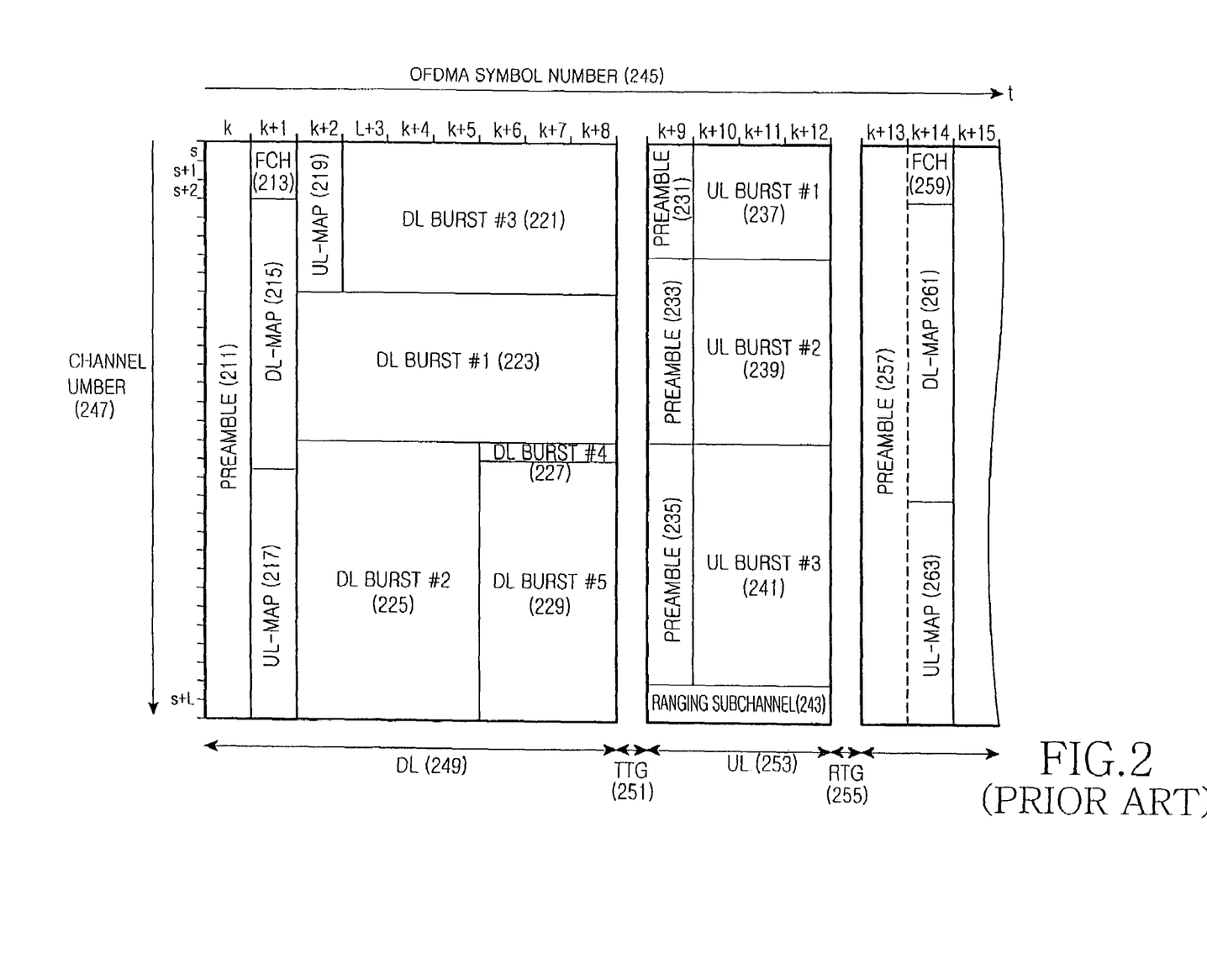
FIG. 2 illustrates a schematic format of a frame a conventional IEEE 802.16d communication system.

Referring to FIG. 2, a horizontal axis 245 denotes an OFDMA symbol number, and a vertical axis 247 denotes a subchannel number. As shown in FIG. 2, one OFDMA frame includes a plurality of, e.g., 13, OFDMA symbols. Also, one OFDMA symbol includes a plurality of, e.g., L+1, subchannels. A main purpose of the IEEE 802.16d communication system is to obtain a frequency diversity gain by distributing entire subcarriers used in the IEEE 802.16d communication system, particularly, data subcarriers, to entire frequency bands. Also, the IEEE 802.16d communication system performs a ranging operation in order to adjust a time offset and a frequency offset in a transmission/reception duration and adjust a transmit power. A change from a downlink to an uplink in the IEEE 802.16d communication system is performed for a transmit/receive transition gap (TTG) 251. Also, a change from the uplink to the downlink is performed for a receive/transmit transition gap (RTG) 255. A sync for a transmission/reception duration can be achieved by allocating separate preamble fields 211, 231, 233 and 235 next to the TTG 251 and the RTG 255.

In the frame format of the IEEE 802.16d communication system, a downlink frame 249 includes the preamble field 211, a frame control header (FCH) field 213, a downlink MAP (DL-MAP) field 215, uplink MAP (UL-MAP) fields 217 and 219, a plurality of downlink burst (DL burst) fields, i.e., a DL burst #1 field 223, a DL burst #2 field 225, a DL burst #3 field 221, a DL burst #4 field 227, and a DL burst #5 field 229.

The preamble field 211 is used to transmit a sync signal, i.e., a preamble sequence, for sync acquisition in a transmission/reception duration. The FCH field 213 includes two subchannels and is used to provide basic information on subchannels, ranging, and a modulation method. The DL-MAP field 215 is used to transmit a DL-MAP message, and the UL-MAP fields 217 and 219 are used to transmit an UL-MAP message. Information elements (IEs) included in the DL-MAP message are illustrated in Table 1.

TABLE 1

| Syntax | Size | Notes |
|---|---|---|
| DL-MAP_IE( ) { | | |
|   DIUC | 4 bits | |
|   if(DIUC==15) { | | |
|     Extended DIUC dependent IE | variable | |
|   } else { | | |
|     if(INC_CID==1) { | | The DL-MAP starts with INC_CID = 0. INC_CID is toggled between 0 and 1 by the CID_SWITCH_IE ( ) |
|     N_CID | 8 bits | Number of CIDs assigned for this IE |
|     for(n=0;n<N_CID;n++) { | | |
|       CID | 16 bits | |
|     } | | |
|   } | | |
|   OFDMA Symbol Offset | 10 bits | |
|   Subchannel Offset | 5 bits | |
|   Boosting | 3 bits | 000: normal (not boosted)<br>001: +6 dB<br>010: −6 dB<br>011: +9 dB<br>100: +3 dB<br>101: −3 dB |

TABLE 1-continued

| Syntex | Size | Notes |
|---|---|---|
|  |  | 110: −9 dB |
|  |  | 111: −12 dB |
| No. OFDMA Symbols | 9 bits |  |
| No. Subchannels | 5 bits |  |
| } |  |  |
| } |  |  |

Referring to Table 1, "DIUC" (Downlink Interval Usage Code) denotes a modulation method and a transmission purpose of a current transmission message, and "CID" denotes a CID of each SS corresponding to the DIUC.

"OFDMA Symbol Offset" denotes an offset of symbol resources allocated to the DL bursts, "Subchannel Offset" denotes an offset of subchannel resources allocated to the DL bursts, "Boosting" denotes a power value increased during transmission, "No. OFDMA Symbols" denotes the number of allocated OFDMA symbols, and "No. Subchannels" denotes the number of allocated subchannels.

As shown in Table 1, downlink information of the IEEE 802.16d communication system is represented by combining information on each SS corresponding to the DIUC. Accordingly, each SS analyzes its own data when the DL-MAP message is perfectly demodulated.

IEs included in the UL-MAP message are illustrated in Table 2.

values described with reference to Table 1, their detailed description is omitted.

Also, in the frame format of the IEEE 802.16d communication system, an uplink frame 253 includes a ranging subchannel field 243, a plurality of preamble fields 231, 233 and 235, and a plurality of uplink bursts (UL bursts), i.e., a UL burst #1 field 237, a UL burst #2 field 239, and a UL burst #3 field 241.

The ranging subchannel field 243 is used to transmit ranging subchannels for ranging, the preamble fields 231, 233 and 235 are used to transmit a sync signal, i.e., a preamble sequence, for sync acquisition in a transmission/reception duration. Information including CIDs allocated to connections is transmitted using the DL-MAP field 215.

A format of a MAC protocol data unit (PDU) will now be described with reference to FIG. 3, which illustrates a schematic format of a MAC PDU of a conventional IEEE 802.16d communication system.

Figure 3:
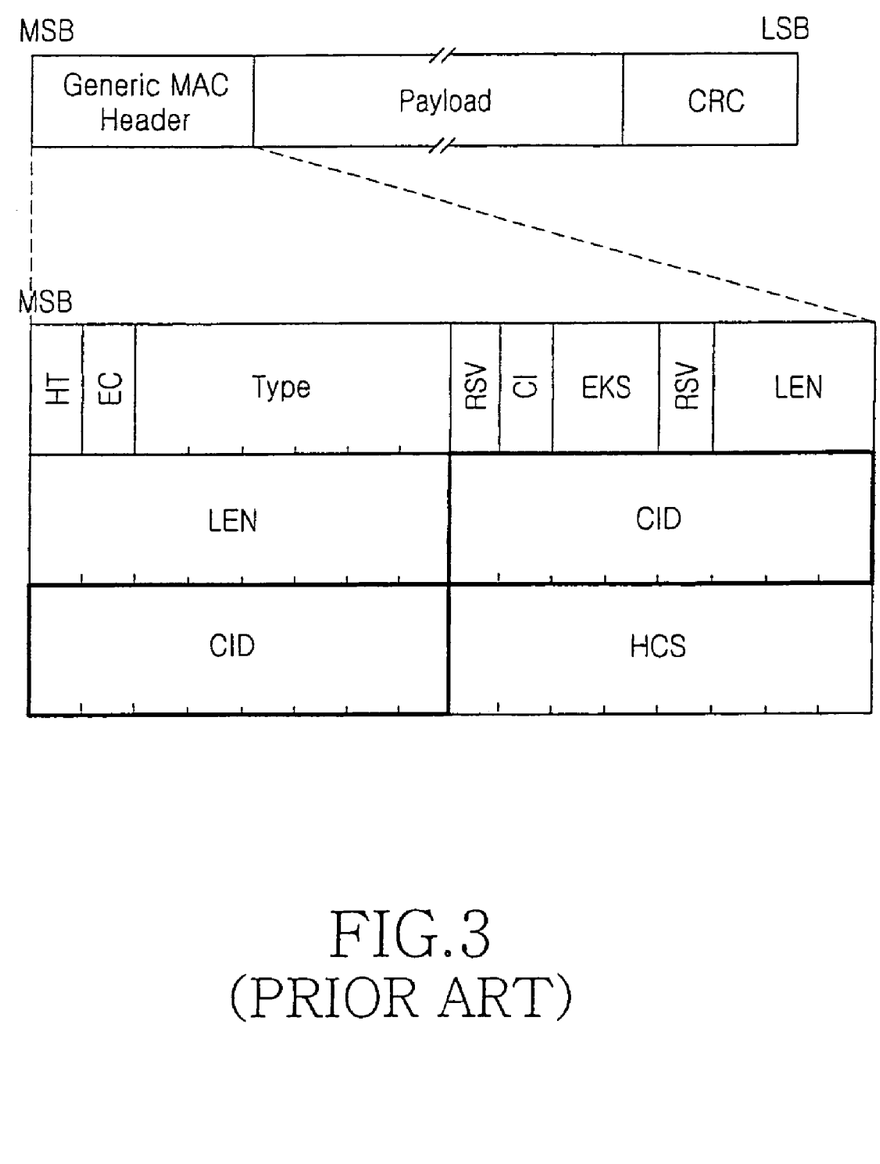
FIG. 3 illustrates a schematic format of a MAC PDU of a conventional IEEE 802.16d communication system.

Referring to FIG. 3, the MAC PDU includes a Generic MAC PDU Header field, a Payload field, and a cyclic redundancy check (CRC) field. The Generic MAC PDU Header field is used to transmit header information for a MAC PDU transmission, the Payload field is used to transmit user data, and the CRC field is used to transmit CRC bits for detecting an error of the MAC PDU.

The Generic MAC PDU Header field includes a header type ("HT") field, an encryption ("EC") field, a "Type" field,

TABLE 2

| Syntex | Size | Notes |
|---|---|---|
| UL-MAP_IE( ) { |  |  |
|     CID | 16 bits |  |
|     UIUC | 4 bits |  |
|     if(UIUC==12) { |  |  |
|         OFDMA Symbol Offset | 10 bits |  |
|         Subchannel Offset | 6 bits |  |
|         No. OFDMA Symbols | 8 bits |  |
|         No. Subchannels | 5 bits |  |
|         Ranging Method | 3 bits | 000: Initial Ranging over two symbols<br>001: Initial Ranging over four symbols<br>010: BW Request/Periodic Ranging over one sysbol<br>011: BW Request/Periodic Ranging over three symbols<br>100-111: reserved |
|     } else if(UIUC==14) { |  |  |
|         CDMA_Allocation_IE ( ) | 52 bits |  |
|     } else if(DIUC==15) { |  |  |
|         Extended DIUC dependent IE | variable |  |
|     } else { |  |  |
|         OFDMA Symbol Offset | 10 bits |  |
|         Subchannel Offset | 5 bits |  |
|         No. OFDMA Symbols | 9 bits |  |
|         No. Subchannels | 5 bits |  |
|         Mini-subchannel index | 3 bits | 000: no mini-subchannels used<br>001: starting with mini-subchannel 1<br>010: starting with mini-subchannel 2<br>011: starting with mini-subchannel 3<br>100: starting with mini-subchannel 4<br>101: starting with mini-subchannel 5<br>110. 111: reserved |
|     } |  |  |
| } |  |  |

Referring to Table 2, "CID" denotes a CID of a relevant SS, and "UIUC" (Uplink Interval Usage Code) denotes a modulation method and a transmission purpose of a message that the SS transmits. Since the other values are similar to the a reserved ("RSV") field, a CRC indicator ("CI") field, an encryption key sequence ("EKS") field, a length ("LEN") field, a "CID" field, and a header check sum ("HCS") field. The "HT" field indicates whether a generic MAC PDU or a bandwidth request message is transmitted. The "EC" field indicates whether a current transmission frame is encrypted. The "Type" field indicates a sub-header type. For example, the "Type" field is represented with 6 bits denoting types shown in Table 3.

TABLE 3

| TYPE | SUB HEADER |
|------|------------|
| #0 | ARQ_ACK ALLOCATION SUB HEADER GM SUB HEADER |
| #1 | PACKING SUB HEADER |
| #2 | FRAGMENTATION SUB HEADER |
| #3 | EXTENDED TYPE |
| #4 | ARQ FEEDBACK PAYLOAD |
| #5 | MESH SUB HEADER |

Referring to Table 3, the "Type" field is represented with 6 bits, and the sub-header type is determined according to a bit value of the "Type" field. That is, bit #0 of the Type field indicates whether an ARQ_ACK allocation sub-header indicating field allocation for transmitting an automatic retransmission request (ARQ) ACK is used or whether a grant management (GM) sub-header for allocating a resource request is used.

Bit #1 of the Type field of the Type field indicates whether a packing sub-header for concatenating and transmitting more than two packets is used when the size of a sub-header packet to be transmitted is smaller than a predetermined size of the sub-header packet.

Bit #2 of the Type field indicates whether a fragmentation sub-header for fragmenting a sub-header packet into more than two packets is used when the size of the sub-header packet is larger than the predetermined size of the sub-header packet.

Bit #3 of the Type field indicates whether an extended type is used.

Bit #4 of the Type field indicates whether an ARQ feedback payload for fast ARQ is used.

Bit #5 of the Type field indicates whether a mesh sub-header for transmitting a packet applied to a mesh network is used.

The "RSV" field is reserved for a future use. The "CI" field indicates whether the MAC PDU uses a CRC. The "EKS" field indicates what kind of encryption key is used, i.e., indicates a kind of an encryption key used in the MAC PDU. The "LEN" field indicates a length of the Payload field of the MAC PDU. The "CID" field indicates a CID of a connection through which the MAC PDU is transmitted. The "HCS" field is used to transmit a HCS used to detect an error of the Generic MAC PDU Header field.

It is assumed that a CID transmitted using the CID field has a 16-bit length, and the CID will now be described.

In order for an MSS to receive services from a BS in a BWA communication system, a connection between the MSS and the BS is established. The connection is established between MAC peers in order to transmit/receive information, i.e., control data and user data, between the MSS and the BS. The number of connections and kinds of the connections are many, and accordingly, CIDs for identifying connections established between the MSS and the BS are allocated. Also, besides the MSS, CIDs can be allocated to all CID-allocatable media. The CID indicates an identification (ID) allocated to each connection by the BS and is transmitted using the Generic MAC PDU Header field. Also, the CID is used for signaling of the MAC layer such as resource allocation and protocol control between the MSS and the BS.

As described above, the CID is a resource necessarily used in signal transmission/reception between the BS and the MSS. However, the CID has a fixed length of 16 bits used in the IEEE 802.16d communication system. As a result, the CID transmission/reception creates overhead in the IEEE 802.16d communication system, decreasing in efficiency of resources.

SUMMARY OF THE INVENTION

An object of the present invention is to substantially solve at least the above problems and/or disadvantages and to provide at least the advantages below. Accordingly, an object of the present invention is to provide a system and method for dynamically allocating a CID having a variable length, in a BWA communication system.

In accordance with one aspect of the present invention, there is provided a connection identification (CID) allocating method in a Broadband Wireless Access (BWA) communication system having a medium access control protocol data unit (MAC PDU) format including a header field including control information and a payload field including user data. The header field includes a first CID field having a first length and indicating a CID of a mobile subscriber station (MSS), a second CID field having a second length and indicating the CID of the MSS by being concatenated with a CID of the first CID field according to a predetermined control, and a type field indicating whether the second CID field is used. The method includes the steps of generating an MSS a CID to be allocated to a particular MSS; and if a length of the MSS CID is equal to the first length, including the determined CID in the first CID field, including, in the type field, information indicating that the second CID field is not used, and transmitting the MAC PDU to the MSS.

In accordance with another aspect of the present invention, there is provided a connection identification (CID) allocating system in a Broadband Wireless Access (BWA) communication system having a medium access control protocol data unit (MAC PDU) format includes a header field including control information and a payload field including user data. The header field includes a first CID field having a first length and indicating a CID of a mobile subscriber station (MSS), a second CID field having a second length and indicating the CID of the MSS by being concatenated with a CID of the first CID field according to a predetermined control, and a type field indicating whether the second CID field is used. The system includes a base station (BS), which determines a CID to be allocated to a particular MSS and if a length of the determined CID is equal to the first length, includes the determined CID in the first CID field, includes, in the type field, information indicating that the second CID field is not used, and transmits the MAC PDU to the MSS; and the MSS, which receives the MAC PDU, and if the type field of the MAC PDU includes information indicating that the second CID field is not used, detects the CID included in the first CID field as its own CID.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

According to embodiments of the present invention, by suggesting a Broadband Wireless Access (BWA) communication system, for example, suggesting a method of dynamically allocating a connection identification (CID) having a variable length in an IEEE 802.16d communication system, resource efficiency of the IEEE 802.16d communication system is maximized.

Figure 4:
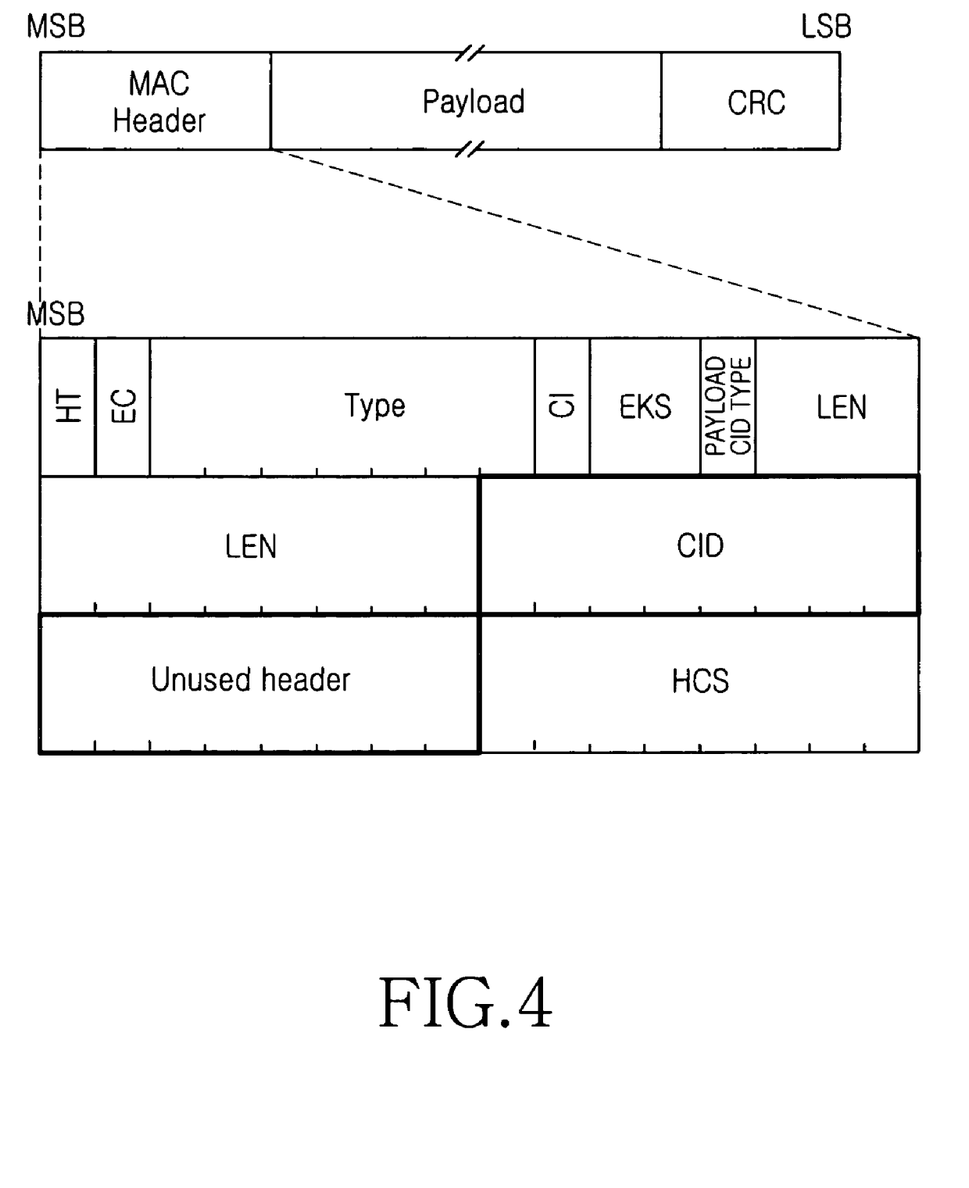
FIG. 4 illustrates a schematic format of a MAC PDU of an IEEE 802.16d communication system according to a preferred embodiment of the present invention.

FIG. 4 illustrates a schematic format of a medium access control protocol data unit (MAC PDU) of an IEEE 802.16d communication system according to a preferred embodiment of the present invention.

Referring to FIG. 4, the MAC PDU includes a "MAC Header" field, a Payload field, and a cyclic redundancy check ("CRC") field. The MAC Header field includes a Header Type ("HT") field, an encryption ("EC") field, a "Type" field, a CRC indicator ("CI") field, an encryption key sequence ("EKS") field, a "Payload CID Type" field, a length ("LEN") field, a "CID" field, an Unused Header" field, and a header check sum ("HCS") field.

The "HT" field is used to determine a general MAC PDU transmission and a bandwidth request. The "EC" field indicates whether a current transmission frame is encrypted. The "Type" field is, for example, represented with 7 bits denoting types shown in Table 4.

TABLE 4

| TYPE | SUB HEADER |
|---|---|
| #0 | ARQ_ACK ALLOCATION SUB HEADER |
|    | GM SUB HEADER |
| #1 | PACKING SUB HEADER |
| #2 | FRAGMENTATION SUB HEADER |
| #3 | EXTENDED TYPE |

TABLE 4-continued

| TYPE | SUB HEADER |
|---|---|
| #4 | ARQ FEEDBACK PAYLOAD |
| #5 | MESH SUB HEADER |
| #6 | EXTEND CID SUB HEADER |

Referring to Table 4, the Type field is preferably represented with 7 bits, and the sub-header type is determined according to a bit value of the Type field.

Bit #0 of the Type field indicates whether an ARQ_ACK allocation sub-header indicating field allocation for transmitting an automatic retransmission request (ARQ) ACK is used or whether a grant management (GM) sub-header for allocating a resource request is used.

Bit #1 of the Type field indicates whether a packing sub-header for concatenating and transmitting more than two packets when the size of a sub-header packet to be transmitted is smaller than a predetermined size of the sub-header packet is used.

Bit #2 of the Type field indicates whether a fragmentation sub-header for fragmenting a sub-header packet to be transmitted into more than two packets and transmitting the packets when the size of the sub-header packet is larger than the predetermined size of the sub-header packet is used.

Bit #3 of the Type field indicates whether an extended type is used.

Bit #4 of the Type field indicates whether an ARQ feedback payload for fast ARQ is used.

Bit #5 of the Type field indicates whether a mesh sub-header for transmitting a packet applied to a mesh network is used.

Here, the bits 0 through 5 are used like a conventional IEEE 802.16d communication system. That is, the sub-header type is determined using the 6 bits of the Type field in the "MAC Header" field of a conventional IEEE 802.16d communication system. However, in a preferred embodiment of the present invention, the sub-header type is determined using the 7 bits by adding a reserved (RSV) field of the MAC Header field of the conventional IEEE 802.16d communication system to the Type field.

Bit "#6" of the Type field indicates whether an extended CID sub-header is present. When an extended CID is used, the extended CID field indicates such and is included in the Payload field. Thus, the 7-bit Type field indicates whether an extended CID sub-header is used, in addition to functioning in the conventional manner to indicate the sub-header type.

The "CI" field of the MAC PDU indicates whether a CRC of the MAC PDU is used. In addition, the "EKS" field indicates what kind of encryption key is used in the MAC PDU, for example.

In the conventional IEEE 802.16d communication system, when the RSV field is 0, a CID in the Payload field is concatenated with 8 bits, and when the RSV field is 1, the CID in the Payload field is concatenated with 16 bits.

The "LEN" field indicates a length of the "Payload" field of the MAC PDU. The "HCS" field is used to transmit an HCS, used to detect errors in the "MAC Header" field.

As described above, in the present embodiment, since a CID is basically allocated with 8 bits, remaining 8 bits of the 16 bits for the CID allocation used in the conventional IEEE 802.16d communication system become the Unused Header field (Payload CID Type field). That is, when a MAC header is configured according to the present embodiment, a CID length is reduced from 16 bits to 8 bits. As a result, signaling overhead is reduced. In addition, as described above, when the CID length is extended, the extended CID field is included in the "Payload" field. In this way, dynamic CID allocation is possible since the CID length is variable.

An ID Type field indicating whether a sub ID is used for mobile subscriber station (MSS) address allocation or control information according to ID types described below is included in the "CID" field of the "MAC Header" field used in the present embodiment. Here, usage according to the ID types is illustrated in Table 5.

TABLE 5

| ID TYPE | SUB ID | USAGE |
|---|---|---|
| 00 | 000000 | BROADCASTING CONTROL |
| 00 | 000001 | BROADCASTING DATA |
| 00 | 000010-111111 | MULTICASTING |
| 01 | 000001-111111 | BASIC ID |
| 10 | 000001-111111 | CONNECTION ID |
| 11 | 000001-111111 | COMMON ID |

Referring to Table 5, when the ID type is '00,' three types of sub IDs exist. First, when the sub ID is '000000,' the sub ID is used for broadcasting control. Second, when the sub ID is '000001,' the sub ID is used for transmission of broadcasting data. Third, when the sub ID is '000010-111111,' the sub ID is used for multiple broadcasting.

When the ID type is '01' and the sub ID is '000001-111111,' the sub ID is used for identifying basic IDs of all of MSSs.

When the ID type is '10' and the sub ID is '000001-111111,' the sub ID becomes a CID and is used for identifying all of connections.

When the ID type is '11' and the sub ID is '000001-111111,' the sub ID indicates a common ID. Also, the ID Type field is used for an initial ranging request, for example.

Although the foregoing description has been made for the case where the CID field is divided into the 2-bit ID Type field and the 6-bit sub ID field, the sizes of the ID type and the sub ID can be variably adjusted.

Figure 5:
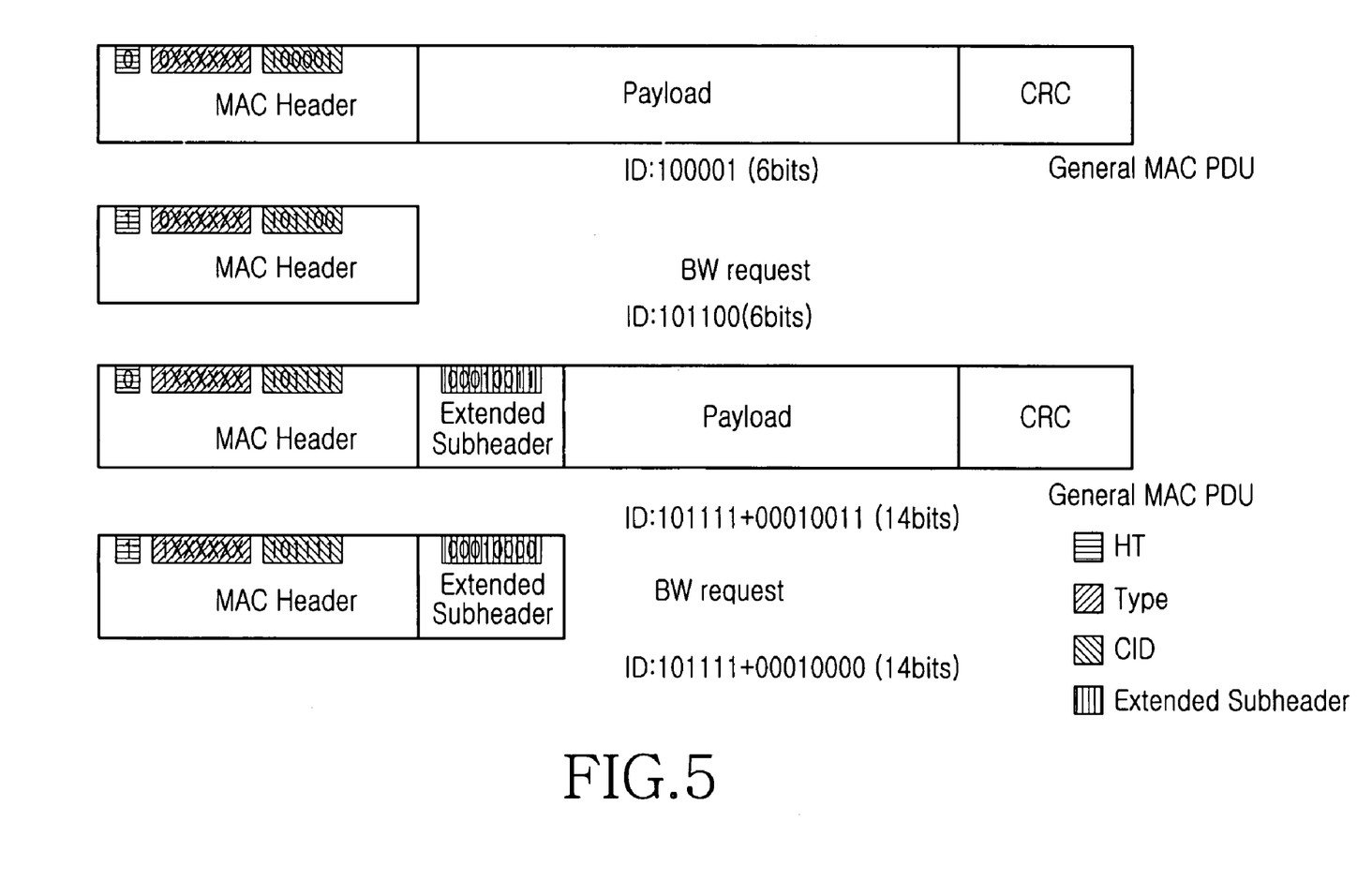
FIG. 5 illustrates schematic formats of frames, each including a MAC header, of an IEEE 802.16d communication system according to a preferred embodiment of the present invention.

FIG. 5 illustrates schematic formats of frames, each including a MAC header, of an IEEE 802.16d communication system according to a preferred embodiment of the present invention.

FIG. 5 further illustrates ID allocation according to frame formats of the MAC Header field. An ID field of the "MAC Header" field is classified into an ID Type field and a sub ID field. The frame formats corresponding to HT field values of the "MAC Header" field are illustrated. When an HT field value is 0, the frame has a general MAC PDU format. When the HT field value is 1, the frame is used for a bandwidth request.

Also, when a value of a Type field is '0XXXXXX,' an 8-bit CID field is used without an extended CID sub-header. However, when the value of the Type field is '1XXXXXX,' the CID field and an extended CID field are used for a CID by extending the extended CID sub-header using a Payload field next to the MAC Header field. A bit, represented by 0 or 1 in the Type field, for determining whether the CID is concatenated is bit #6 from Table 4. The extended CID field is illustrated in Table 6.

TABLE 6

| Extended Sub Header Format | ID name | Usage |
|---|---|---|
| 00000000~11111111 | Extended ID | Extend all ID |

Referring to Table 6, the extended sub-header format indicates that an extended sub-header can have one of '00000000-11111111,' the ID name is an extended ID, and the extended sub-header is used to extend all of IDs. The use of the extended ID field enables extension of the number of bits used to identify IDs.

In FIG. 5, values of CIDs in the frames including the general MAC PDUs and the bandwidth requests corresponding to the HT field values are '100001,' '101100,' '10111100010011'and '10111100010000', by way of example. Also, when the Type field value is '0XXXXXX,' the IDs are not extended, and when the Type field value is '1XXXXXX,' the IDs are extended. "Here, in the case that the Type field is", 8 bit following a MAC header indicates an extended sub-header. The exemplary frame formats of the present invention increase the number of MSSs that can be accommodated. A sub ID is used for smaller numbers and an extended CID sub-header is concatenated for larger numbers.

In the address allocating method described above, if only the sub IDs shown in Table 5 are used for a base station (BS) to identify MSSs in one cell or one sector, 64 ($=2^6$) MSSs can be identified, and if the extended IDs shown in Table 5 are concatenated, 16384 ($=2^{14}$) MSSs can be identified.

Figure 6:
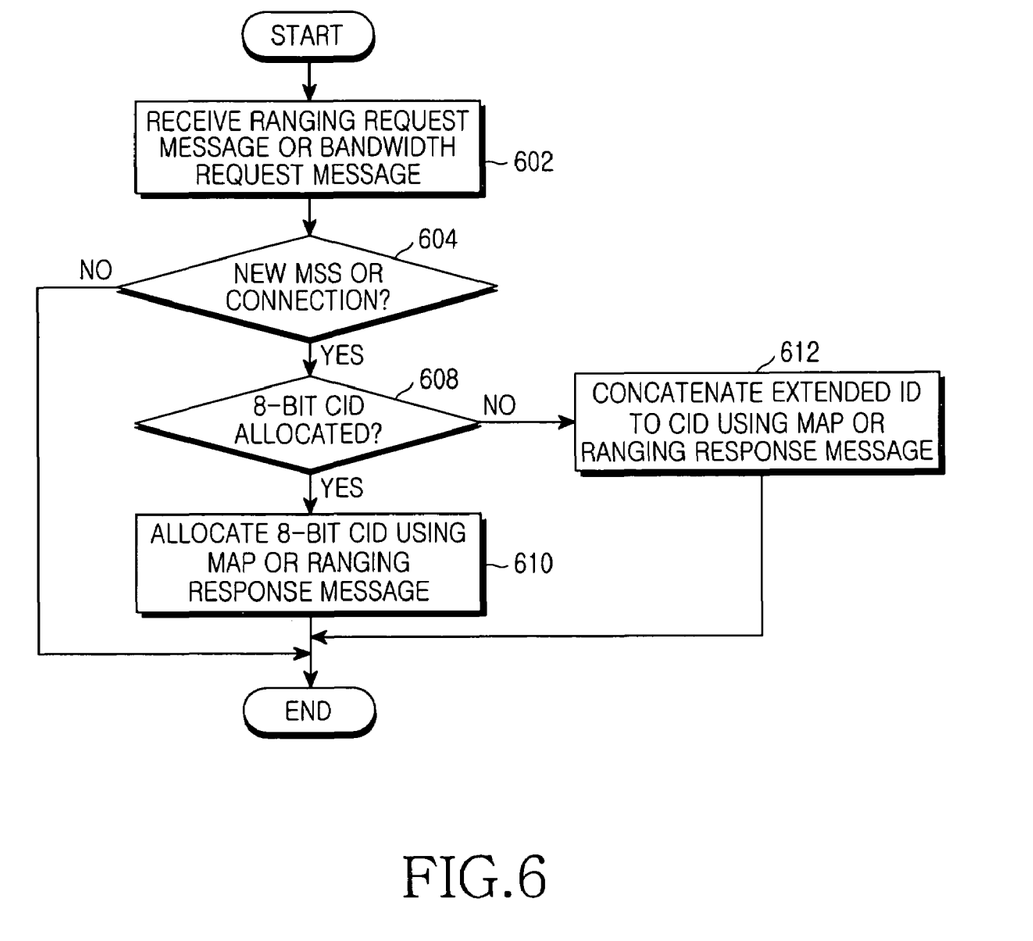
FIG. 6 is a flowchart illustrating an operation of a base station, which dynamically allocates a CID, according to a preferred embodiment of the present invention.

FIG. 6 is a flowchart illustrating operation of a BS, which dynamically allocates a CID, according to a preferred embodiment of the present invention.

Referring to FIG. 6, in step 602, the BS receives a ranging request message or a bandwidth request message for dynamically allocating an ID from an MSS. In step 604, the BS determines whether the request message is transmitted from a new MSS. If the message is not transmitted from a new MSS, the BS finishes the ID allocation process.

If the message is transmitted from a new MSS, the BS determines, using 8 bits of a Payload field, whether an extended CID sub-header field is used in step 608. If the BS can allocate an address to the new MSS only with a CID of a MAC Header field, the BS allocates the address to the new MSS without the extended CID sub-header field in step 610. If the BS determines that the extended CID sub-header field is necessary, the BS allocates an 8-bit ID and an 8-bit extended CID sub-header to the new MSS using a MAP or ranging response message in step 612. After finishing the dynamic CID allocation, the BS ends the ID allocation process.

In the ID allocation process, if a CID can be allocated only with a CID field of a MAC PDU, the CID is allocated only with the CID field. Also, if an 8-bit extended CID is additionally needed, the CID can be extended to 16 bits using an extended CID field by controlling a MAC Header field. Accordingly, the CID can be dynamically allocated. Therefore, while the length of a conventional MAC Header field is 48 bits, the length of a MAC Header field proposed in the present invention is 40 bits by reducing 8 bits from the length of a CID. A CID can be extended and allocated using an extended CID of a Payload field according to a request of an MSS.

Figure 7:
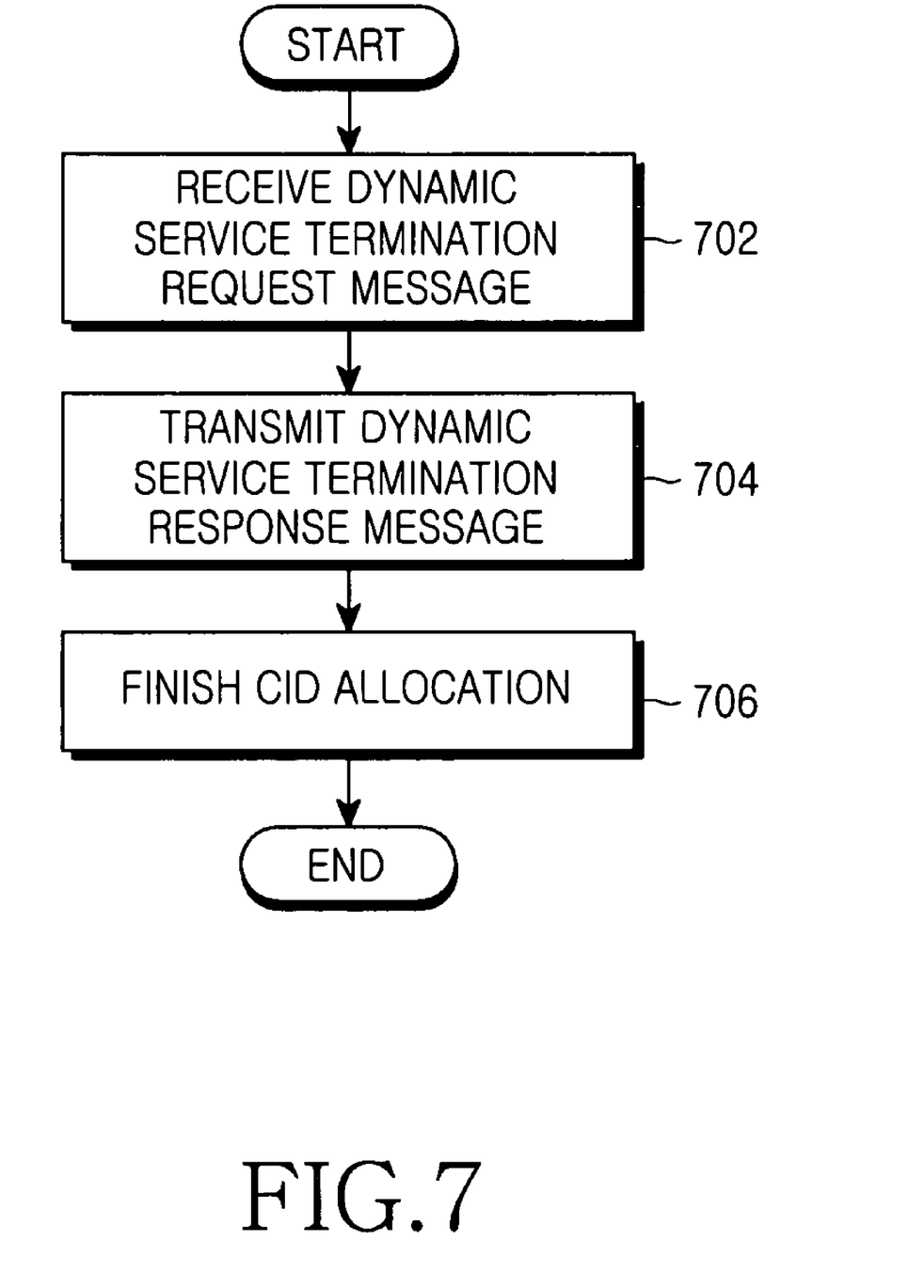
FIG. 7 is a flowchart illustrating an operation of a base station, which dynamically withdraws a CID, according to a preferred embodiment of the present invention.

FIG. 7 is a flowchart illustrating operation of a BS that dynamically withdraws a CID, according to a preferred embodiment of the present invention.

Referring to FIG. 7, the BS receives a Dynamic Service Termination Request message from an MSS in order to withdraw a CID in step 702. In step 704, the BS transmits a Dynamic Service Termination Response message to the MSS from which the Dynamic Service Termination Request message is received. In step 706, the BS finishes the CID allocation by withdrawing the CID in step 702.

Figure 8:
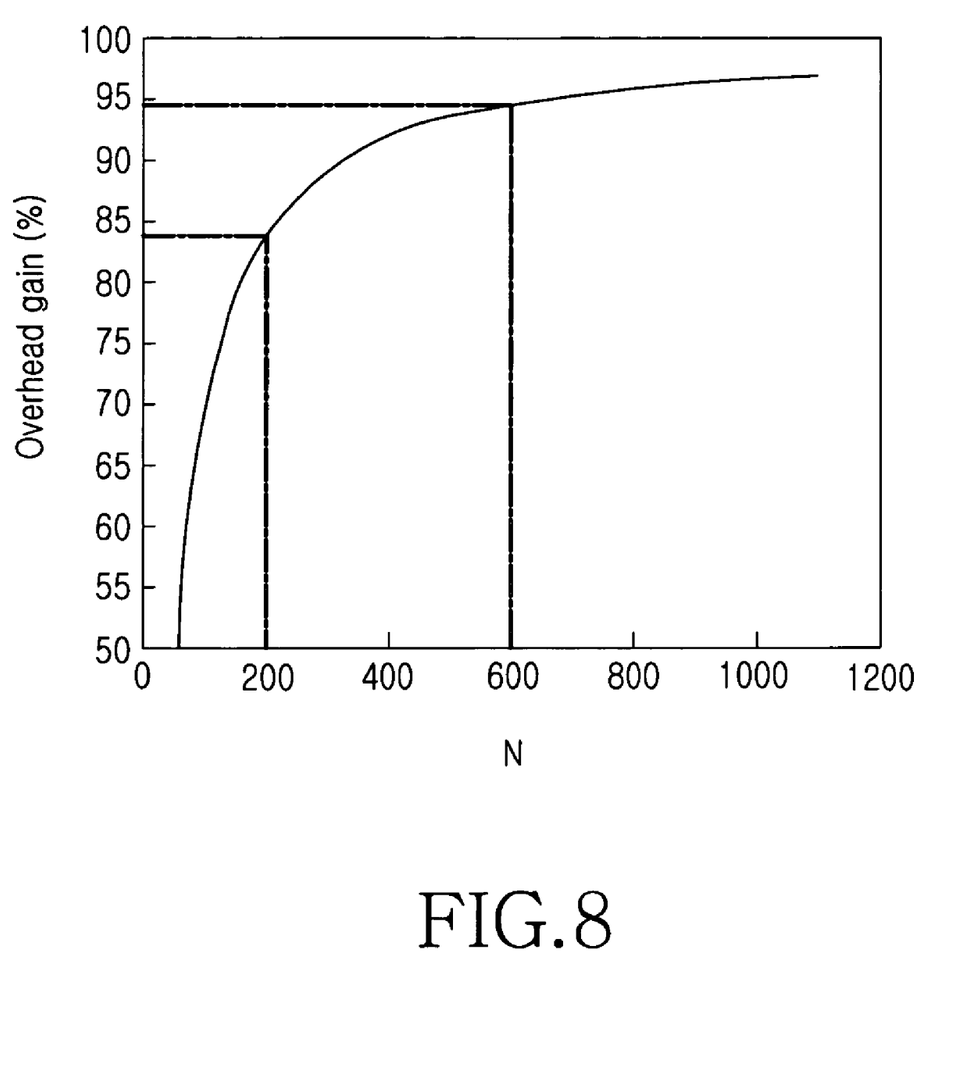
FIG. 8 is a graph illustrating an overhead gain with a performance curve according to the preferred embodiment of the present invention.

FIG. 8 is a graph illustrating an overhead gain with a performance curve according to a preferred embodiment of the present invention.

Referring to FIG. 8, a vertical axis of the graph denotes a percentage of the overhead gain, and a horizontal axis denotes the number N of MSSs to which CIDs are allocated. The graph shows a user gain according to an increase in number of the MSSs. The overhead gain is represented by Equation 1.

$$\text{Overhead Gain} = \frac{\text{System Overhead with 8 Bit } CID}{\text{System Overhead when 16 Bit } CID} \times 100 \quad \text{Equation 1}$$

Referring to Equation 1, the denominator is overhead in a conventional IEEE 802.16d communication system, and the numerator is overhead according to an embodiment of the present invention. A percentage of the fractional value is the overhead gain. So, when the overhead gain is small, overhead efficiency is improved. Accordingly, considering the overhead efficiency according to the number N of MSSs, when the number N is between 200 and 600 in a common system, total overhead efficiency of the system is improved about 5 to 16%.

As described above, in the embodiments of the present invention, signaling overhead due to CID transmissions is minimized by dynamically allocating a CID having a variable length in a BWA communication system. Accordingly, the minimization of the signaling overhead due to the CID transmissions maximizes resource efficiency of the BWA communication system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A connection identification (CID) allocating method in a Broadband Wireless Access (BWA) communication system having a medium access control protocol data unit (MAC PDU) format comprised of a header field including control information and a payload field including user data, wherein the header field comprises;
   a first CID field having a first length and indicating a CID of a mobile subscriber station (MSS),
   a second CID field having a second length and indicating the CID of the MSS by being concatenated with a CID of the first CID field according to a predetermined control, and
   a type field indicating whether the second CID field is used,
   the method comprising the steps of:
   generating an MSS CID to be allocated to a particular MSS; and
   if a length of the MSS CID is equal to the first length, including the MSS CID in the first CID field, including, in the type field, information indicating that the second CID field is not used, and transmitting the MAC PDU to the MSS.

2. The method of claim 1, further comprising:
   if the length of the MSS CID is equal to a sum of the first length and the second length, including the MSS CID in the first CID field and the second CID field by concatenating the first CID field to the second CID field, including, in the type field, information indicating that the second CID field is used, and transmitting the MAC PDU to the MSS.

3. The method of claim 1, wherein the second length is set to be equal to the first length.

4. The method of claim 1, wherein the second length is set to be different from the first length.

5. The method of claim 1, wherein the header field further comprises a field including information indicating whether the second length is equal to or different from the first length.

6. A connection identification (CID) allocating system in a Broadband Wireless Access (BWA) communication system having a medium access control protocol data unit (MAC PDU) format comprised of a header field including control information and a payload field including user data,
   wherein the header field comprises;
   a first CID field having a first length and indicating a CID of a mobile subscriber station (MSS),
   a second CID field having a second length and indicating the CID of the MSS by being concatenated with a CID of the first CID field according to a predetermined control, and
   a type field indicating whether the second CID field is used,
   the system comprising:
   a base station (BS), which determines a CID to be allocated to a particular MSS and if a length of the determined CID is equal to the first length, includes the determined CID in the first CID field, includes, in the type field, information indicating that the second CID field is not used, and transmits the MAC PDU to the MSS; and
   the MSS, which receives the MAC PDU, and if the type field of the MAC PDU includes information indicating that the second CID field is not used, detects the CID included in the first CID field as its own CID.

7. The system of claim 6, wherein the BS, if the length of the determined CID is equal to a sum of the first length and the second length, includes the determined CID in the first CID field and the second CID field by concatenating the first CID field to the second CID field, includes, in the type field, information indicating that the second CID field is used, and transmits the MAC PDU to the MSS.

8. The system of claim 7, wherein the MSS receives the MAC PDU, and if the type field of the MAC PDU includes information indicating that the second CID field is used, detects the CID included in the first CID field and the second CID field by concatenating the first CID field to the second CID field as its own CID.

9. The system of claim 6, wherein the second length is set to be equal to the first length.

10. The system of claim 6, wherein the second length is set to be different from the first length.

11. The system of claim 6, wherein the header field further comprises a field including information indicating whether the second length is equal to or different from the first length.

* * * * *